United States Patent Office 3,291,615
Patented Dec. 13, 1966

3,291,615
METHOD FOR PREPARING QUICK-COOKING, STORAGE STABLE LEGUMES
Joseph J. Thompson and Winston F. Allen, Battle Creek, Mich., assignors to Kellogg Company, Battle Creek, Mich., a corporation of Delaware
No Drawing. Filed Mar. 12, 1963, Ser. No. 264,697
3 Claims. (Cl. 99—98)

This invention relates to the production of quick cooking, sometimes termed "instant" food products.

More particularly, the present invention relates to the method of preparing quick cooking, dried, storage-stable, whole, discrete legumes, from similar hard, raw, dried, whole, discrete legumes of commerce.

A particular object of the present invention is to provide instant or quick cooking beans and peas of the class aforesaid, which are treated in a manner whereby they may be rapidly prepared for eating.

It is a further object of the present invention to prepare quick cooking, storage-stable, dry beans and peas which substantially retain their natural and individual shapes and wherein the aforesaid legumes remain smooth and bright with no "butterflies" and with very few split, bursted or broken units.

In general the method of the present invention comprises preparing quick cooking, dried, whole beans or peas by subjecting dried, raw, whole beans or peas of commerce to a combination of steps including steaming, soaking, thorough cooking and controlled drying in a novel and economical manner and with sufficient heat to prevent the growth of micro-organisms that might cause odor and decomposition but gentle enough so as to prevent any appreciable amount of splitting or butterflying as aforesaid resulting from the differential rate of drying between the skin and the cotyledon.

The process is carried out without the deliberate employment of means to rupture the skin, and on the contrary as previously indicated is directed to prevention of such rupture, splitting or bursting and to such end the process is characterized by control of the re-drying conditions from a stage where the legumes which have been soaked to moisture content of from about 50% or more are dried down to about 20% or less moisture content and whereby in this drying stage of the process there is very little difference in drying rate on all sides of each unit. Further, the rate of removal of moisture is held in check so that the outside of the skin and cotyledon do not dry too rapidly and whereby the difference in moisture content between the interior of the legume and the outside areas thereof is held below the point of causing sufficient strain to result in the aforesaid splitting or bursting.

A further object of the present invention is to provide a process for the production of quick or instant cooking beans and peas in an economical manner and by generally conventional equipment which lends itself to continuous processing.

In general the process of the present invention comprises starting with beans or peas of commerce in hard, dried, whole condition and which conventionally have a moisture content of from about 8% to about 12% by weight. These are first cleaned by washing them in water which may be at room temperature or in cold or lukewarm condition and screened and hand picked if necessary. Promptly after washing they are placed on a foraminous carrier such as a screen or other perforated vessel to drain, and then subjected to a pre-steaming or blanching operation by disposing them in a foraminous vessel or screen bottomed tray in a thin layer within an autoclave for several minutes at a temperature of about 212° F. Promptly thereafter, the pre-steamed product is subjected to soaking in hot water for several hours until the moisture content has risen to approximately 52–60% by weight.

Thereafter, the liquid is drained and the beans or peas are then disposed on a foraminous carrier in an enclosed vessel such as an autoclave for several hours where they are cooked by steam at temperatures varying from about 220° to about 250° F., depending upon the variety, age, and moisture of the dried beans or peas of commerce.

Thereafter, the heating is terminated by releasing the steam pressure gradually and the vessel partly opened to permit its contents to cool and the moisture to partially varporize therefrom while remaining in the vessel under the conditions of high humidity therein. Upon cooling, the cooked material is transferred to another foraminous support in a drying chamber. In the alternative, the cooked material is passed directly from the cooking vessel to a foraminous slowly rotating horizontal drum type vessel in a drying chamber without exposure to outside air, thereby maintaining a higher temperature.

The cooked material is then held in or moved very slowly through the drying chamber (or series of chambers) in a manner so as to permit air circulation all around and through the body of the beans or peas. During this stage the temperature and relative humidity are controlled so that for several hours the temperature is maintained at from about 100° to 180° F., at a relative humidity or from about 55% to about 70%, and then the temperature is gradually raised to about 130° to 200° F., with slightly lower relative humidity for a few more hours or until such time as the beans or peas contain from about 17% to about 21% moisture. They are then transferred to a vat or run directly into another foraminous rotating horizontal drum type vessel through which a slightly more vigorous hot air current passes at a temperature from about 130° to about 220° F., with much lower relative humidity until the moisture content of the beans is below about 12.5%. The resulting product composed of discrete beans or peas is spread out on shallow trays or on a moving belt and allowed to cool below 100° F., or to normal room temperature before storing in a tank or putting into packages.

As a more specific example of the present invention, a body of white navy beans are spread over a #5 U.S.S. screen, washed in tap water, using 1 part of water to 2 parts of beans by weight, with constant stirring for about 2 minutes, after which they are spread out onto a 6 or 8 mesh screen to drain. A second wash of 1 part of water to 4 parts of beans is given by sprinkling the beans on the screen and then allowing them to drain for about 2 minutes.

The washed beans on the screen-bottom tray spread to a depth of about ½ to 1 inch are immediately steamed in an autoclave for about 15 minutes under a steam pressure of 0.5 pound per square inch guage equivalent to a temperature of about 212° F.

The blanched beans are then quickly transferred to a receptacle in hot water at a temperature of from about 120° to about 150° F., and preferably a temperature of from about 130° to about 145° F., in the proportion of about 2 parts of water to about 1 part of dried beans by weight.

The beans are soaked in the hot water for a period of from about 3 to about 6 hours and suitably will be maintained at the preferred temperature for about 4 to about 5 hours with the beans submerged during the entire period. Any small, hard beans that are resistant to soaking in water and which will not be completely cooked are here removed by screening through a #3 U.S.S. screen.

The screening and removal of undesirable units may be done near the end of the soaking period and the beans placed back in the same soak water for an additional short period, following which the liquid is drained off.

The soaked beans which now have a moisture content of approximately 52–56% are immediately spread onto a 6 to 8 mesh screen bottomed tray to a depth of 1 to 2 inches, and cooked in an autoclave with steam for approximately 1¾ hours at steam pressure of 5 pounds per square inch gauge or approximately 220° F. At the end of this period the steam pressure is released very slowly and the door of the autoclave opened 1 or 2 inches for release of water vapor and to allow as much water as possible to vaporize from the beans while they are hot and the humidity in the autoclave remains high. This occupies about 20 minutes and during this time the beans are spread out as thin as possible on the foraminous tray or trays within the autoclave.

Thereafter, the beans are removed from the autoclave and placed into a receptacle covered by means for example with a cloth, and then transferred to a drying room or cabinet having automatic temperature and humidity control. They are here spread out in thin layers of from about ¼ to about ½ inch deep on 6 to 8 mesh screen bottomed trays with air circulation all around the trays. The temperature at the start for about 3½ hours is maintained at 100–120° F., and at 62–65% relative humidity, and then the heat is gradually raised to approximately 130–140° F., with slightly lower relative humidity such as about 58–62%. The constant temperature in this area is accomplished by radiant heat units or infrared lamps. After a period of about 2½ to 4 hours at the higher temperature, or when the beans contain less than 20% moisture they are transferred to a vat or drier and agitated therein with gentle hot air current at a temperature starting at about 130–140° F., in about 1½ hours until the moisture content of the beans is reduced to about 8 to 12%, after which the beans are allowed to cool in shallow trays to room temperature.

The resulting product is stable and will keep for many months or indefinitely provided the beans are kept in a container that allows slight breathing of outside air and not exposed to dampness to the extent of unduly raising the moisture content of the beans.

These thoroughly cooked beans are easily made ready to serve by merely boiling in water for approximately 10 minutes.

The entire process can be accomplished by the use of a series of horizontally mounted drums rotating at about 2 to about 10 r.p.m. Perforated or 5 to 8 mesh drums can be employed for the cleaning and pre-steaming and drying operations and a solid metal drum for the soaking operation. In such continuous process a calculated amount of hot water can be added for the soaking step that will completely soak into the beans to give the optimum moisture content of from about 52–58% for the required time period. In the drying operation infrared lamps or radiant heat units can be evenly spaced or disposed around the revolving screen drum for uniform application of heat to the beans.

In order to shorten the soaking and cooking time a weak alkali such as sodium bicarbonate can be added to the soaking water in an amount that will provide a pH of about 6.9 at the end of the soaking period. This can also be accomplished by addition of a weak acid such as acetic or citric acid to the soaking water such that the pH at the end of the soaking period is about 5.5.

Although the foregoing example is specific to navy beans, it will be understood that the invention is equally applicable to other dried beans and peas of commerce which are designated by various names some of which indicate species or varieties; some sizes and colors; and others localities and countries or growth or origin. Thus, some of these, for the purpose of illustration and not limitation, are as follows: navy or pea beans, pinto beans, chick peas, cowpea or black-eyed pea, Indian bean, broad bean or Windsor or horse bean, French or haricot bean, red kidney or scarlet runner bean, lima bean, field pea or English Garden pea, terpay bean, frijole or small flat black Mexican kidney bean, soya bean, chili bean, Michigan pea beans, blackeyed or China beans, red beans, Great Northern beans, red Mexican beans, white kidney beans, black or turtle beans, U.S. #1 pink beans, marrowfat beans, Japanese beans, cranberry beans, yelloweye beans, Adsuki beans, canario brown beans, Vera Cruz black beans, Swedish brown beans, and others.

In another specific example, for the purpose of illustration and not limitation, black Mexican beans containing 8.4% moisture were screened over a #5 U.S.S. sieve, handpicked; and then 4 pounds were weighed out and put into 2 pounds of cold tap water contained in an 8 inch diameter stainless steel beaker. The beans were washed by stirring for 2 minutes then spread onto a 11 inch x 29 inch stainless steel 8 mesh screen bottom tray, sprinkled with 1 pound of cold tap water, and allowed to drain 2 minutes. The tray containing the washed beans was immediately put into an autoclave and steamed 15 minutes at 212° F. (about 0.5 p.s.i.g.).

The steamed beans were transferred to the 8 inch diameter stainless steel beaker containing 8.5 pounds of very warm tap water and stirred constantly until a constant temperature reading of 144.5° F. was obtained. The beaker was placed in a hot water bath and the beans were stirred every 15 minutes for 4.5 hours. The temperature of the water and beans was 140.0 to 144.5° F. The beans were submerged during the entire period. Excess liquid was drained off the beans.

The soaked beans were screened over a #3 U.S.S. sieve which removed 0.867 pound of small hard beans. (This was 10.4% of the total sample.)

The beans were resoaked for 30 minutes in the excess liquid at 132° to 138° F. to replace the surface moisture lost by evaporation during the screening operation. After draining off the excess liquid again (for about 1 minute) the beans and liquid were weighed and tested with the following results:

Soaked beans—7.59 pounds contained 58.8% water.
Excess liquid—3.687 pounds contained 0.176 pound bean solids The soaked beans were poured onto the 8 mesh screen tray and leveled off to a depth of 1½ inches to 2 inches, and quickly put into a preheated autoclave and cooked for 2 hours at 15 p.s.i.g. (about 244° F.) with a moderate flow of steam through the autoclave. The autoclave was brought down to 0 p.s.i.g. (pounds per square inch gauge) in 10 minutes and the door opened about 2 inches allowing the beans to cool and vaporize considerable moisture for about 20 minutes before removing tray and contents from the autoclave.

The beans were then quickly transferred to the stainless steel beaker and covered. Temperature of beans was 141° F. Weight 6.66 pounds. Moisture 53.0%. The beans were stored overnight in a refrigerator at 35° F. After warming to room temperature on a tray the beans were transferred to a high humidity chamber at 100° F. and spread in a thin layer onto three 8 mesh stainless steel 1 by 3 foot trays, which were stacked about ¾ inch apart so that all the trays had air circulation on all sides. A thin white coarse textured paper was placed over the top screen over which three 250 watt infrared heat lamps were suspended at a distance of about two feet. The beans in the top screen were stirred every 15 minutes and the stacking arrangement was changed every 30 minutes for a period of 6 hours. Temperature in contact with beans on top of screen varied from 102° to 125° F. at 63 to 64% relative humidity. The beans were then consolidated on one screen tray, lamps lowered to 16 inches from the beans and dried for 0.5 hour longer to 21% moisture. Finally, the beans were spread onto a 1 foot by 3 foot screen tray and allowed to remain overnight (21 hours) on a table in the open at 70 to 85° F. (Note:

Overnight drying at room temperature was done as a matter of convenience in this experiment and to illustrate that the final drying can be done this way. If a continuous process is desired and speed is important the same degree of drying without splitting can be accomplished in 1 to 2 hours in a vigorous current of hot air (not humidified) at 140° to 180° F.).

The finished product was as follows:

| | |
|---|---|
| Yield | 3.51 pounds. |
| Moisture | 12.2%. |
| Density | 43.20 pounds per cubic foot. |
| Split, bursted and broken beans | 7.7% (no "butterflies"). |
| Appearance | Bright and smooth. |
| Hard beans | 1.0% (after boiling 10 minutes in water). |
| Taste | Good (after boiling 10 minutes in water). |

We claim:

1. The method of preparing a body of quick cooking, edible, hard, dry, whole, storage-stable, discrete legumes which comprises subjecting a body of whole, dried, washed legumes having a moisture content of from about 8% to about 12% by weight in said dried condition to steaming for several minutes at a temperature of about 212° F., soaking the resulting pre-steamed legumes in hot water for several hours to a moisture content of from about 52% to about 60% by weight, draining said water therefrom and heating the legumes in an enclosed zone for several hours with steam at a temperature of from about 220° F., to about 250° F., disposing the cooked material in a drying chamber for several hours, first at a temperature of from about 100° to about 180° F., and at a relative humidity of from about 55% to about 70% and then at a temperature of from about 130° to about 200 F., in a slightly lower relative humidity until the legumes have a moisture content of from about 17% to about 21%, then finally drying the legumes with agitation at temperatures increasing from about 130° to 220° F., for a period of time sufficient to dry the legumes to a moisture content substantially that of the starting material.

2. The method of preparing a body of quick cooking, edible, hard, dry, whole, storage-stable, discrete beans which comprises washing, draining, and disposing a body of whole, dried beans having a moisture content of from about 8% to about 12% by weight in an enclosed receptacle, and subjecting them therein for several minutes to blanching at a temperature of about 212° F., soaking the resulting beans in a body of water at a temperature of from about 120° F., to about 150° F., for a period of from about 3 to about 6 hours, until the moisture content has increased to approximately 52-60% by weight, separating the soaked beans from said water and heating them while disposed in a closed zone for several hours with steam at a temperature of from about 220° F., to about 250° F., gradually releasing the steam pressure and partially opening the closed zone to permit the moisture content of the cooked material to partially vaporize therein, transferring said beans to a drying chamber, and further drying the cooked material for several hours at an initial temperature of from about 100° to about 180° F., and a relative humidity of from about 55% to about 70% to a final temperature of from about 130° to about 200° F., until the beans have their moisture content reduced to below about 21%, then subjecting the beans to further drying with circulating air increasing from an initial temperature of from about 130° to about 220° F., and until the moisture content of the beans is about 12.5%, and permitting the dried product to cool to room temperature.

3. The method of preparing a body of quick cooking, edible, hard, dried, whole, storage-stable, discrete beans substantially free of split, bursted or broken beans, which comprises washing and draining a body of whole, dried beans having a moisture content of from about 8% to about 12% by weight, subjecting them to pre-steaming at a temperature of about 212° F. for approximately 15 minutes, soaking the resulting pre-steamed beans in water heated to a temperature of from about 130 F., to about 145° F., for a period of from 3 to about 6 hours, and until their moisture content has increased to approximately 52-60%, disposing the soaked beans in a thin layer in an enclosed zone and cooking them therein first for about 1½ to about 2 hours at a temperature of from about 225° F., to about 250° F., gradually releasing the steam pressure while retaining the cooked material in said zone for a period of about 20 minutes with the zone in partially open condition to permit release of water vapor from the beans while hot and the humidity in the zone is high, drying the cooked beans by transferring them to a drying chamber in thin layers by heating them therein for a period of from about 3 to about 4 hours at a temperature of from about 100° to about 180° F., at about 55% to about 70% relative humidity, and then for about 2 to about 4 hours at a temperature gradually raised to from about 130° F., to about 200° F., at slightly lower relative humidity until the moisture content of the beans is below 21%, and then further drying the beans with agitation and air heated initially to a temperature of from about 130° gradually increasing to about 220° F. in from about 1 to about 2 hours until the moisture content of the beans is reduced to a range of from about 8 to about 12.5%, and cooling and recovering the resulting beans.

References Cited by the Examiner
UNITED STATES PATENTS

| | | | |
|---|---|---|---|
| Re. 4,468 | 7/1871 | Smith | 99—204 |
| 1,602,830 | 10/1926 | MacPherran | 99—204 |
| 1,813,268 | 7/1931 | Bachler | 99—98 |
| 1,859,279 | 5/1932 | Chamberlain | 99—204 |
| 2,267,747 | 12/1941 | Plews | 99—98 |

A. LOUIS MONACELL, *Primary Examiner.*

BEATRICE H. STRIZAK, *Examiner.*

S. J. BAICKER, S. E. HEYMAN, *Assistant Examiners.*